G. Notman,
Horse Rake,
No. 102,578. Patented May 3, 1870
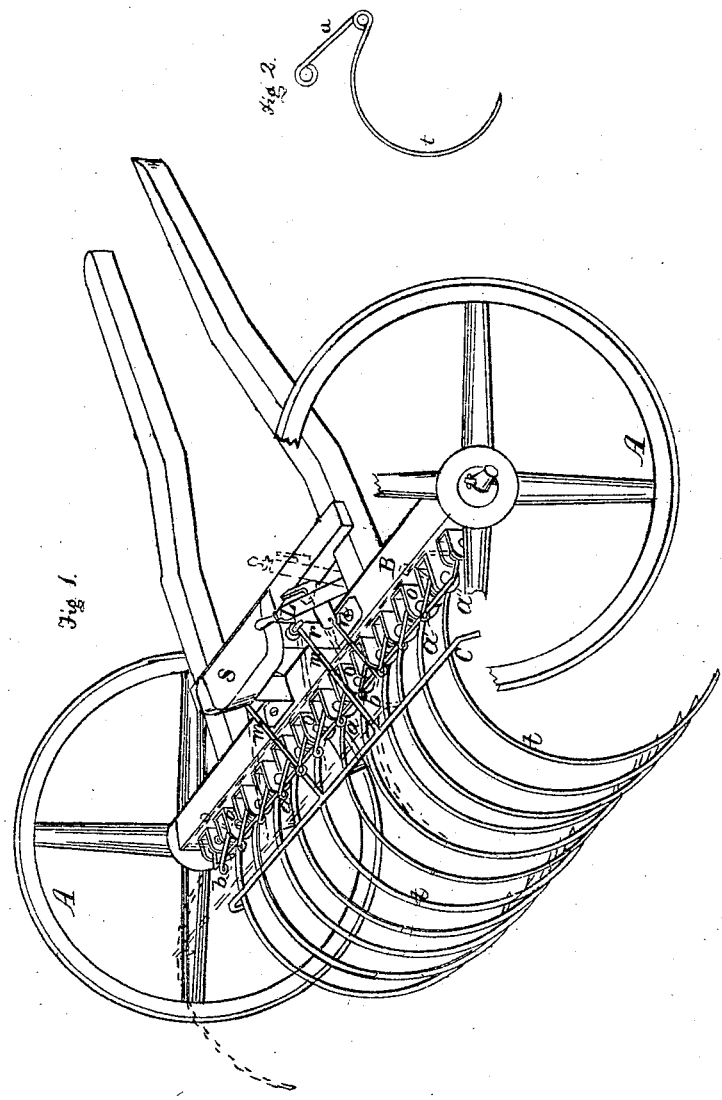
Witnesses:
N. H. Finckel
Wm. J. Peyton
Inventor:
George Notman.
by John A. Wiedersheim
Atty.

United States Patent Office.

GEORGE NOTMAN, OF DEERFIELD, OHIO.

Letters Patent No. 102,578, dated May 3, 1870.

IMPROVEMENT IN HORSE HAY-RAKES.

The Schedule referred to in these Letters Patent and making part of the same.

*To all whom it may concern:*

Be it known that I, GEORGE NOTMAN, of Deerfield, in the county of Portage and State of Ohio, have invented new and useful improved Hay and Grain-Rakes; and I do hereby declare the following to be a clear and exact description thereof, sufficient to enable others skilled in the art to which my invention appertains to make and use the same, reference being had to the accompanying drawings making part of this specification, in which—

Figure 1 represents a perspective view of my improved horse-rake, and

Figure 2 represents a detached view of one of the teeth.

Similar letters indicate like parts in both figures.

This invention relates to that class of machines known as hay and grain-rakes, and consists in the construction and arrangement of certain parts, hereinafter to be described.

In the accompanying drawings—

B is the axle, to which the rake-teeth are attached, and on which is the driver's seat, and which is supported and carried by the wheels A A.

On the rear side of the axle B are lugs or projections $o$ $o$, see fig. 1, perpendicular thereto, each pair of which serves as journals for the small shafts $a$ $a'$, around each of which a tooth of the rake is wound, thus allowing each tooth to rise and fall independently of the others.

Each tooth is curved at its lower portion, as seen at $t$, figs. 1 and 2, and then passes several times around its shaft $a'$, and is then bent, as shown more clearly at $a$, fig. 2, the object of which will hereinafter be more fully set forth.

Each tooth, with its corresponding arm, is made in one piece, as shown clearly in fig. 2.

$b$ is a bent bar, hinged to the rear side of the axle or frame of the machine at the outer sets of the lugs $o$ $o$, and lying parallel to the axle or main frame B.

$n$ is a rod, attached at one end to the bent bar $b$, the other end being connected with a bent lever L, which can easily be operated by the driver, in his seat S.

The bent bar $b$ lies directly under the arms $a$ $a$ $a$ of the rake-teeth, and a forward movement of the lever L, operating the bar $b$, will raise said teeth, and a reverse movement depress them.

$r$ is a shaft, having its bearings in the seat-standards, and free to rotate therein.

To this shaft $r$ are attached the two rods or links $m$ $m$, the opposite ends of the latter being connected with the cleaner C, which rests on the teeth of the rake. When the latter is raised by the forward movement of the lever L, the cleaner travels upon the top of the rake-teeth, effectually cleaning them.

Having thus described my invention,

What I claim as new, and desire to secure by Letters Patent, is—

1. The arrangement of the bent rod $b$, between the arms $a$ $a$ and teeth $t$ $t$, so as to act both as a raiser and presser of the rake-teeth, in connection with the lever L and rod $n$, as herein shown and described.

2. The bent rod $b$, arranged between the arms $a$ $a$ and teeth $t$ $t$, acting as a raiser and presser, in connection with the lever L, rod $n$, shaft $r$, rods $m$ $m$, and cleaner C, as herein shown and described.

The above signed by me this 21st day of January, 1870.

GEORGE NOTMAN.

Witnesses:
N. L. WANN,
H. B. HUTSON.